NUT HARVESTER
Filed Aug. 16, 1962 3 Sheets-Sheet 1
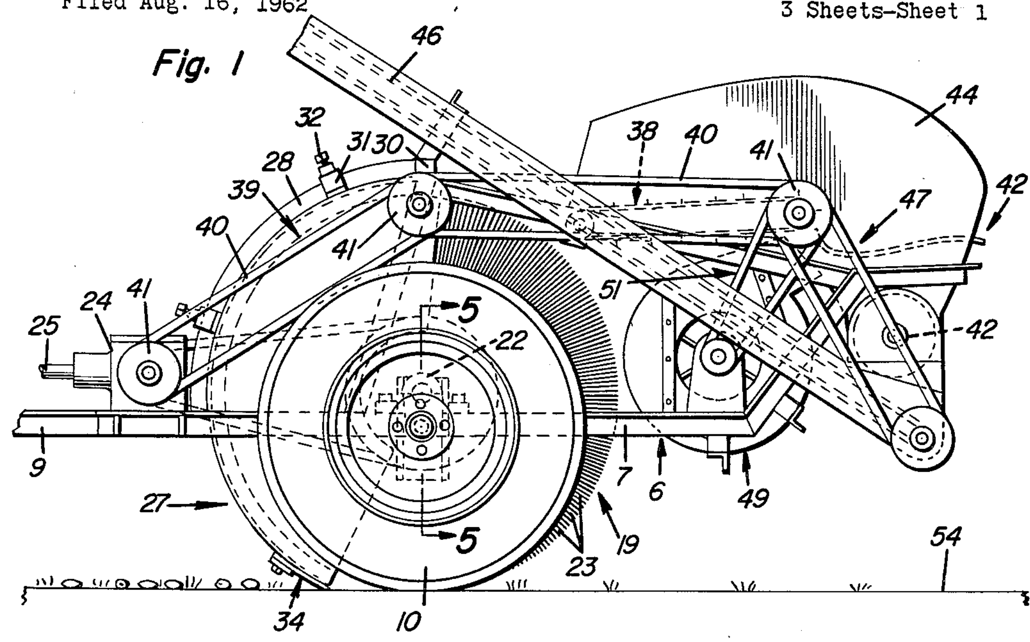
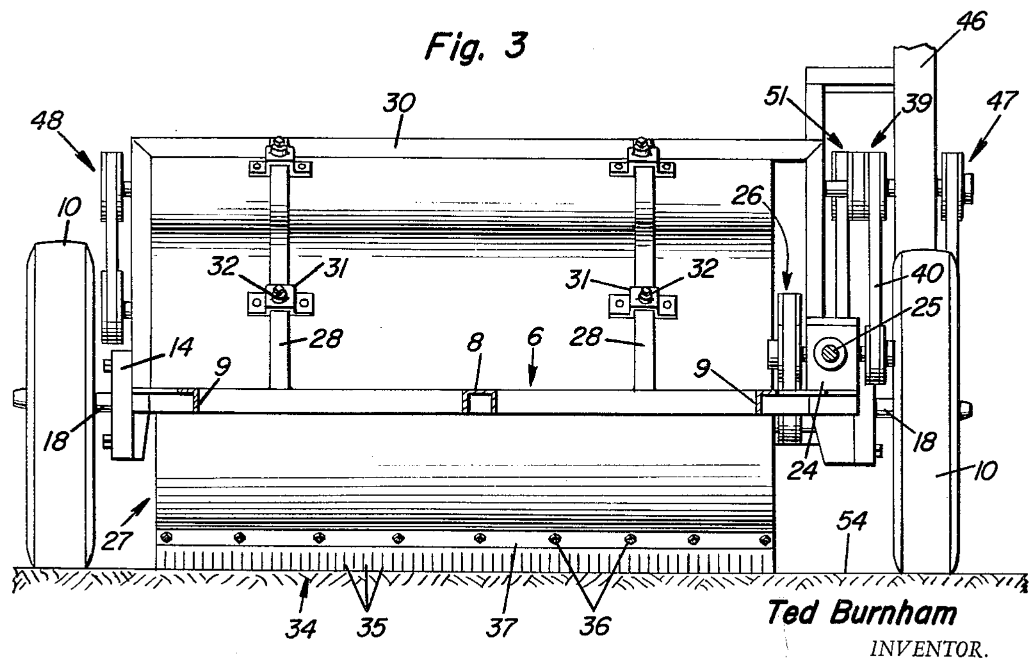
Ted Burnham
INVENTOR.
BY Clarence A. O'Brien
and Harvey B. Jacobson
Attorneys

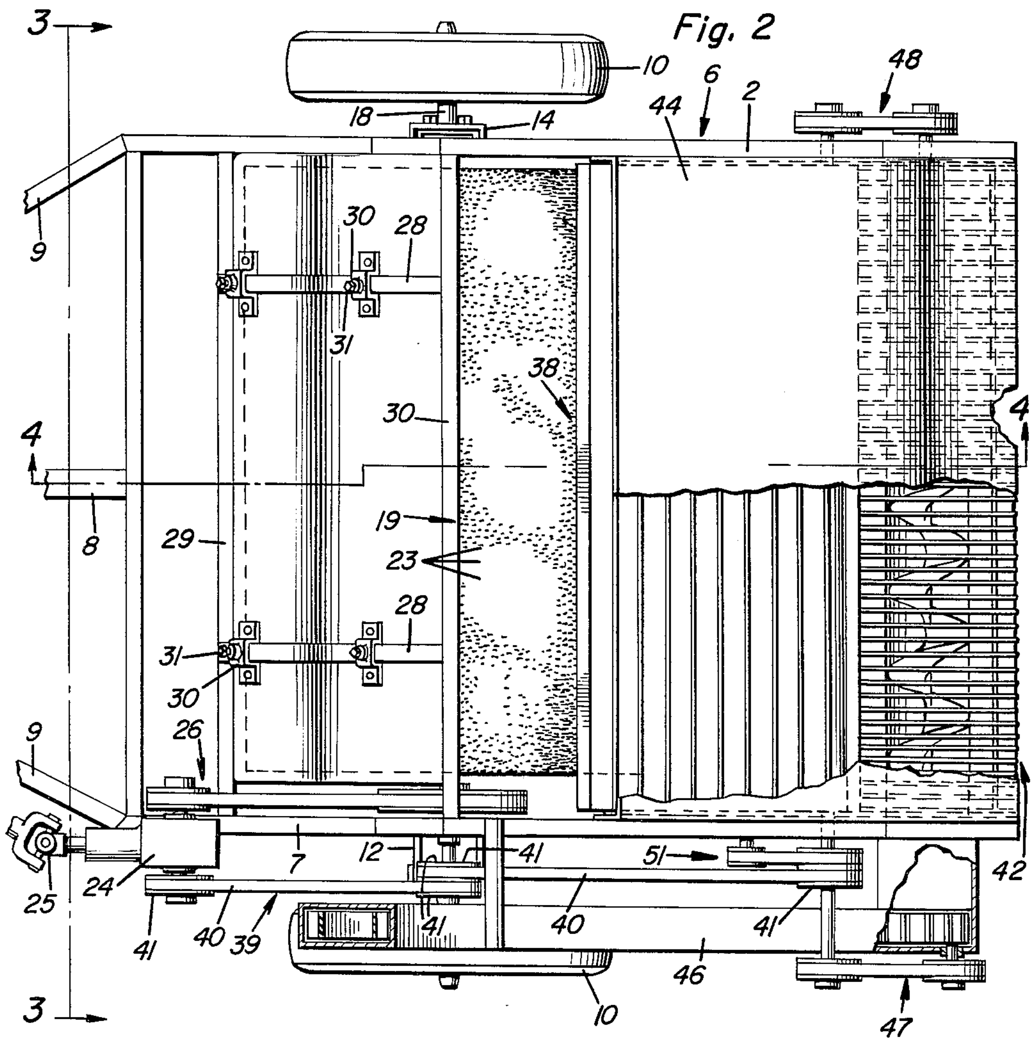
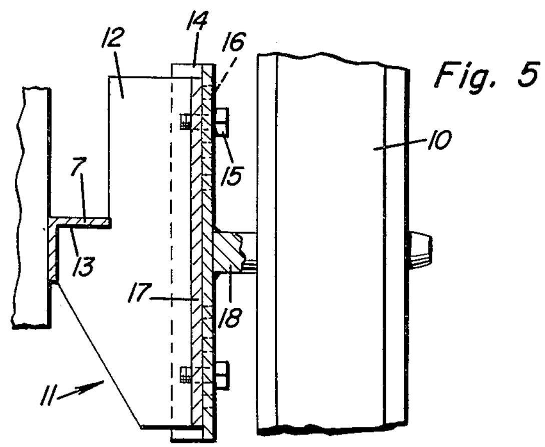
Ted Burnham
INVENTOR.
BY Clarence A. O'Brien
and Harvey B. Jacobson
Attorneys NUT HARVESTER
Filed Aug. 16, 1962
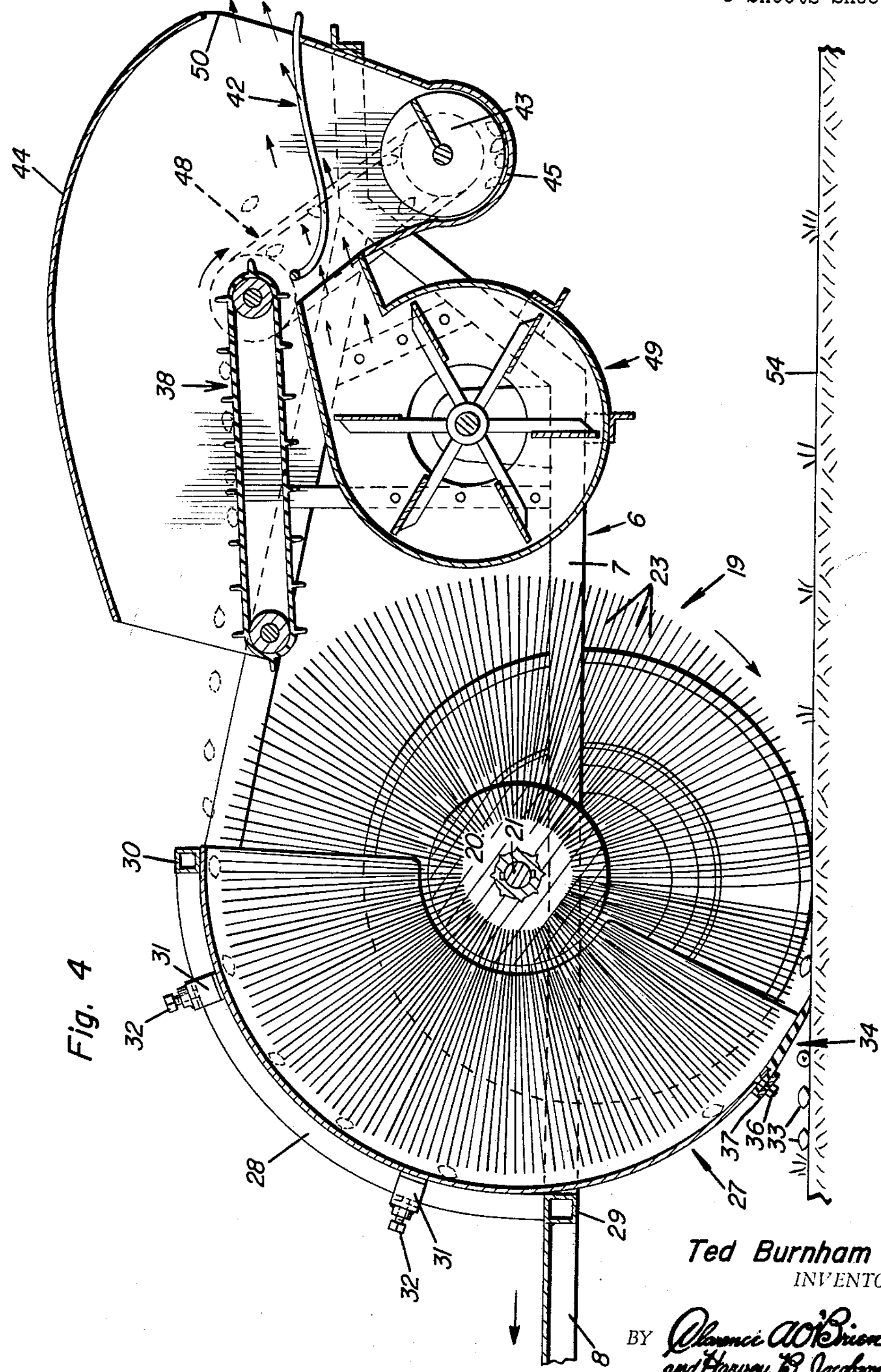
Ted Burnham
INVENTOR.
BY Clarence A. O'Brien
and Harvey B. Jacobson
Attorneys

United States Patent Office 3,131,526
Patented May 5, 1964

1

3,131,526
NUT HARVESTER

Ted Burnham, P.O. Box 201, San Saba, Tex.

Filed Aug. 16, 1962, Ser. No. 217,497
4 Claims. (Cl. 56—328)

This invention relates to new and useful improvements in fallen nut harvesting machines particularly but by no means necessarily, for pecans, and has for its primary object to provide, in a manner as hereinafter set forth, novel power actuated means for rapidly gathering such nuts from the ground.

Another important object of the present invention is to provide a harvesting machine of the character described comprising a rotary nut sweeping and elevating broom and an arcuate shield cooperable therewith, said broom and shield being adjustable to meet various conditions.

Still another highly important object is to provide a harvesting machine of the aforementioned character which includes unique means for deflecting or directing the nuts into the shield as they are swept from the ground by the rotary broom.

A further object of the invention is to provide an improved harvesting machine of the character set forth comprising means for pneumatically cleaning the nuts as they are gathered.

Other objects of the present invention are to provide a nut gathering or harvesting machine which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a nut harvesting machine constructed in accordance with the present invention;

FIGURE 2 is a top plan view of the machine with portions broken away in section;

FIGURE 3 is a view in transverse section, taken substantially on the line 3—3 of FIGURE 2;

FIGURE 4 is a view in vertical longitudinal section through the machine on an enlarged scale, taken substantially on the line 4—4 of FIGURE 2; and FIGURE 5 is a fragmentary view in vertical section on an enlarged scale through one of the wheel mounts, taken substantially on the line 5—5 of FIGURE 1.

Referring now to the drawing in detail, it will be seen that the embodiment of the invention which has been illustrated comprises a frame structure of suitable metal which is designated generally by reference numeral 6. The frame structure 6 includes a pair of longitudinal side bars or members 7. Extending forwardly from the frame 6 is a tongue or the like 8 for connecting the machine to the rear end of a tractor (not shown) to be drawn thereby. Braces 9 are provided for the tongue 8.

The frame 6 is mounted for vertical adjustment on a pair of supporting wheels 10. In the embodiment shown, the wheels 10 are mounted on intermediate portions of the side bars 7 of the frame 6 by inwardly opening generally channel-shaped vertical brackets 11 (see FIGURES 2 and 5). The inwardly extending flanges 12 of the vertical brackets 11 are horizontally stepped at 13 to accommodate the bars 7 to which said brackets are affixed as by welding. Channel plates or members 14 are mounted for vertical sliding adjustment on the brackets 11. Bolts 15 secure the channel members or plates 14 on the brackets 11. The bolts 15 are inserted selectively through spaced openings 16 which are pro-

2 vided therefor in the plates 14 for adjusting the plates 14 in relation to the brackets 11. The bolts 15 are threaded through openings which are provided therefor in the bight or web portions 17 of the brackets 11. Projecting from the plates 14 are spindles or axles 18 on which the wheels 10 are journaled.

Mounted horizontally for rotation in the frame structure 6 between the bars 7 thereof is a cylindrical nut sweeping and elevating broom 19. The broom 19 includes a hub structure 20 which is mounted on a shaft 21 having its end portions journaled in bearings 22 which are provided therefor on the frame bars 7. Radiating from the hub structure 20 of the brush 19 are bristles 23 of suitable wire or the like. Mounted on the front portion of the frame 6, at one side thereof, is a gear box 24. Suitable means such as a shaft and universal joint assembly 25 is provided for operatively connecting the gear box 24 to the usual power take-off of the tractor (not shown). A belt and pulley drive 26 operatively connects the gear box 24 to the broom 19 through a suitable pulley connected to the broom.

As viewed in FIGURES 1 and 4 of the drawing, the machine travels from right to left. Mounted on the forward portion of the frame structure 6 in a manner to receive the front portion of the broom 19 and cooperable with said broom is a substantially arcuate segmental shield or baffle 27 of suitable metal. It will be noted that the shield 27 is concentric with the broom 19 and includes arcuate side plates encompassing the ends of the broom. The shield 27 is secured beneath arcuate supporting bars 28 for rotary adjustment in relation to the broom 19. The arcuate bars 28 have their ends affixed to the front bar or member 29 of the frame structure 6 and to an elevated bar 30 on said frame structure. Loops 31 on the upper portion of the shield 27 are slidable on the arcuate bars 28. Setscrews 32 are provided in the loops for securing the loops 31 in adjusted position on the bars 28.

As indicated by one of the arrows in FIGURE 4 of the drawing, the broom 19 rotates clockwise or opposite to the direction of travel of the machine. Thus, the nuts to be gathered as indicated at 33, are swept forwardly and upwardly from the surface of the ground 54 into the shield or baffle 27 to be elevated by said broom. Toward this end, a resilient deflector or guide 34 of the rubber or other suitable material is secured on the lower portion of the shield 27 in a manner to extend downwardly and rearwardly therefrom and drag or trail over the surface 54 of the ground. To facilitate sliding or riding over the nuts 33 in its path, the deflector 34 is slit from the bottom edge thereof to provide resilient fingers 35. Bolt assemblies 36 secure the deflector 34 on the lower edge of the shield 27, the bolt assemblies passing through a metallic bar 37 engaging the bottom of said deflector thereby clamping the deflector to the shield 27. As shown in FIGURE 4, the heads of bolt assemblies 36 are countersunk to present a smooth surface for easier movement of the nuts being swept onto the shield 27. Also note that the deflector 34 has a recessed edge receiving the edge of the shield 37.

Mounted on the upper rear portion of the frame structure 6 for receiving the gathered nuts as they are thrown from the broom 19 and shield 27 is a rearwardly travelling endless belt type conveyor 38 having upstanding transverse ribs or slats thereon. A drive 39 comprising endless belts and pulleys 40 and 41, respectively, operatively connects the gear box 24 to the rear drum of the conveyor 38. Mounted on the rear end portion of the frame structure 6 for receiving the nuts by gravity from the rear end of the conveyor 38 is a screen 42 of the spaced, parallel rod type which curves upwardly at the rear thereof to retain nuts thereon while permitting egress of trash, sticks and the like. Also mounted on the rear portion of the frame structure 6, below the screen 42 for receiving nuts therefrom, is a transverse spiral conveyor 43. A metallic shield 44 on the frame structure 6 covers the conveyor 38, the screen 42 and the spiral conveyor 43. The lower rear portion of the shield 44 is formed to provide a trough or housing 45 in which the spiral conveyor 43 is operable.

Mounted on one side of the frame structure 6 at the discharge end of the spiral conveyor 43 for receiving the nuts therefrom is a forwardly and upwardly inclined elevating conveyor 46. The elevating conveyor 46 is for depositing the gathered nuts in a suitable bin (not shown). A belt and pulley drive 47 on one side of the machine operatively connects the rear end of the conveyor 38 to the elevating conveyor 46. On the other side of the machine (FIGURE 2) a substantially similar drive 48 operatively connects the conveyor 38 to the spiral conveyor 43.

Mounted on the rear portion of the frame structure 6, below the conveyor 38, is a centrifugal fan or blower 49. The blower 49 is adapted to direct a blast of air upwardly and rearwardly through the screen 42 for removing trash, etc., from the nuts as they gravitate through said screen from the conveyor 38 to the spiral conveyor 43. An air outlet 50 is provided in the rear portion of the shield 44. A belt and pulley drive 51 operatively connects the rear end of the conveyor 38 to the blower 49.

It is thought that the operation of the machine will be readily apparent from a consideration of the foregoing. Briefly, as the harvester is drawn forwardly by the tractor the cylindrical rotary broom 19 is rotated from the power take-off of said tractor in a direction opposite to the direction of travel. As the machine travels forwardly the slit, resilient deflector 34 rides easily over the nuts. The nuts are then swept forwardly and upwardly by the oppositely rotating broom 19, the deflector 34 positively directing said nuts upwardly into the shield or baffle 27. This constitutes a highly desirable and important feature of the invention. It will be observed that the resilient deflector 34 will readily adapt to nuts of various shapes and sizes. The gathered nuts are carried centrifugally and upwardly and thrown rearwardly by the broom 19 onto the conveyor 38 as said nuts emerge from the shield 27. From the conveyor 38 the nuts drop by gravity to the transverse spiral auger conveyor 43, said nuts passing through the screen 42 where trash, etc., is removed therefrom by the fan or blower 49. From the spiral conveyor 43 the cleaned nuts are discharged into the elevating conveyor 46 to be deposited thereby in a suitable bin or other receptacle. By shifting the shield 27 concentrically about the brush 19 on the arcuate bars 28 the resilient deflector 34 may be adjusted as desired relative to the ground surface 54. Also, the flight of the nuts to the conveyor 38 may be thus regulated or controlled. The adjustability of the frame structure 6 on the supporting wheels 10 allows the broom 19 to be raised or lowered relative to the ground. It will be observed that the shield 27 functions as a ramp or the like on which the nuts are swept by the rotary broom 19. As the nuts emerge from the shield or ramp 27 the resiliency of the wire bristles 23 assists in impelling or flipping the nuts to the conveyor 38. In this connection it is to be noted that the wire bristles 23 will be slightly bent or displaced and tensioned by the nuts as they pass upwardly in the shield or ramps 27. Although the machine is, as hereinbefore stated, primarily intended for harvesting fallen nuts such as pecans, almonds, walnuts and the like, said machine manifestly may be utilized for any other purpose for which it may be found adapted such as, for example, gathering fruit, golf balls on driving ranges and even stones.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fallen nut harvesting machine comprising a wheeled frame, an arcuate ramp mounted on the frame, a cylindrical broom rotatably mounted on the frame concentric with the ramp for sweeping nuts from the ground up said ramp and out the top thereof, means for actuating the broom, means on the frame for rotatably adjusting the ramp about the center of rotation of the broom, the last named means including arcuate bars mounted on the frame in spaced, concentric relation to the broom, and loops on the ramp slidably adjustable on the bars for adjustably mounting said ramp thereon.

2. A fallen nut harvesting and cleaning machine comprising, in combination, a wheeled frame, a segmental ramp mounted vertically on said frame, a cylindrical broom journaled on the frame rearwardly of the ramp and operable in the ramp for sweeping nuts from the ground up said ramp and out the top thereof, means for rotating the broom, a screen mounted on the frame, a conveyor above the screen for receiving the nuts from the ramp and discharging said nuts on the screen, and a fan on the frame for blowing a stream of air through the screen as the nuts pass therethrough.

3. The combination of claim 2, together with a second conveyor mounted on the frame for receiving the nuts from the screen.

4. The combination of claim 3, and an elevating conveyor mounted on the frame for receiving the nuts from said second conveyor.

References Cited in the file of this patent

UNITED STATES PATENTS

| | | |
|---|---|---|
| 2,514,945 | Fortier | July 11, 1950 |
| 2,807,128 | Helfrich | Sept. 24, 1957 |
| 2,978,859 | Tubbs | Apr. 11, 1961 |